United States Patent [19]
Sears

[11] Patent Number: 5,968,321
[45] Date of Patent: Oct. 19, 1999

[54] VAPOR COMPRESSION DISTILLATION SYSTEM AND METHOD

[75] Inventor: Stephan B. Sears, Menlo Park, Calif.

[73] Assignee: Ridgewood WaterPure Corporation, Hudson, Ohio

[21] Appl. No.: 08/600,432

[22] Filed: Feb. 13, 1996

[51] Int. Cl.⁶ .................... B01D 1/28; B01D 3/42
[52] U.S. Cl. .............. 202/172; 159/24.1; 159/28.6; 159/44; 159/DIG. 35; 165/167; 202/176; 202/181; 202/182; 202/186; 203/1; 203/23; 203/24; 203/96; 203/DIG. 8
[58] Field of Search .................... 202/182, 181, 202/176, 267.1, 172–173, 193, 196, 186, 202, 155, 160; 203/22, 71, 23–24, 86, 27, 87, 96, 1–2, DIG. 8, DIG. 9, DIG. 18, 10–11; 159/DIG. 15, 24.1, 16.3, 28.6, 44, DIG. 35, DIG. 40; 165/165, 167; 137/391–395, 398, 428

[56] References Cited

U.S. PATENT DOCUMENTS

| | | | |
|---|---|---|---|
| 3,469,617 | 9/1969 | Palmason | 159/DIG. 35 |
| 3,557,863 | 1/1971 | Becker | 203/49 |
| 3,880,232 | 4/1975 | Parker | 165/166 |
| 3,956,072 | 5/1976 | Huse | 202/180 |
| 4,168,211 | 9/1979 | Pottharst, Jr. | 203/26 |
| 4,283,255 | 8/1981 | Ranshaw et al. | 203/86 |
| 4,313,494 | 2/1982 | Bengtsson | 165/166 |
| 4,331,514 | 5/1982 | Bauer | 202/181 |
| 4,511,436 | 4/1985 | el Din Nasser | 202/174 |
| 4,539,076 | 9/1985 | Swain | 202/154 |
| 4,601,381 | 7/1986 | Nukala et al. | 202/176 |
| 4,671,856 | 6/1987 | Sears . | |
| 4,763,488 | 8/1988 | Johnston | 159/28.6 |
| 4,769,113 | 9/1988 | Sears . | |
| 4,774,676 | 9/1988 | Stenzel et al. | 73/861.56 |
| 4,869,067 | 9/1989 | Sears . | |
| 4,902,197 | 2/1990 | Rhodes et al. . | |
| 4,919,592 | 4/1990 | Sears et al. . | |
| 4,978,429 | 12/1990 | Sears et al. . | |
| 5,242,548 | 9/1993 | Youngner | 202/185.1 |
| 5,587,054 | 12/1996 | Keith | 202/182 |
| 5,597,453 | 1/1997 | Sears | 203/24 |

FOREIGN PATENT DOCUMENTS

| | | |
|---|---|---|
| 504136 | 4/1976 | U.S.S.R. . |
| 581381 | 12/1977 | U.S.S.R. . |
| 1068581 | 5/1967 | United Kingdom . |

*Primary Examiner*—Virginia Manoharan
*Attorney, Agent, or Firm*—Flehr Hohbach Test Albritton & Herbert LLP

[57] ABSTRACT

Distillation system having an evaporator/condenser core with heat transfer plates welded together along their edges to form alternate boiling and condensing chambers. Feed liquid is supplied to the boiling chambers through a pair of heat exchangers which preheats the liquid and a steam stripper utilizing ceramic pieces to remove gasses from the liquid. Vapor from the boiling chambers is compressed and delivered to the condensing chambers where it is condensed and gives up its heat to the liquid in the boiling chambers. Pumps positioned between the two heat exchangers draw the condensed product and unvaporized feed liquid containing dissolved solids from the evaporator/condenser and circulate them through the heat exchangers to transfer heat to the feed liquid. The level of the liquid in the boiling chambers is maintained by means of a sight glass and a photosensor which monitors the level of liquid in the sight glass and controls the operation of a valve in the feed line to control the amount of feed liquid delivered to the boiling chambers. The distilled product is collected in a manifold at the output side of the condensing chamber, and the level of the product in the manifold is maintained by means of another sight glass and sensor which controls the operation of a valve in the product line downstream of the two heat exchangers. Pressure in the boiling chambers is monitored by means of a manometer tube with level switches which control the application of heat to the chambers and shut the system down in case the pressure gets too high or too low. The heat exchanger has corrugated plates which are formed by a rolling process and clamped together, with seals bonded to the plates defining counter-flow chambers between them for the different liquids.

12 Claims, 7 Drawing Sheets

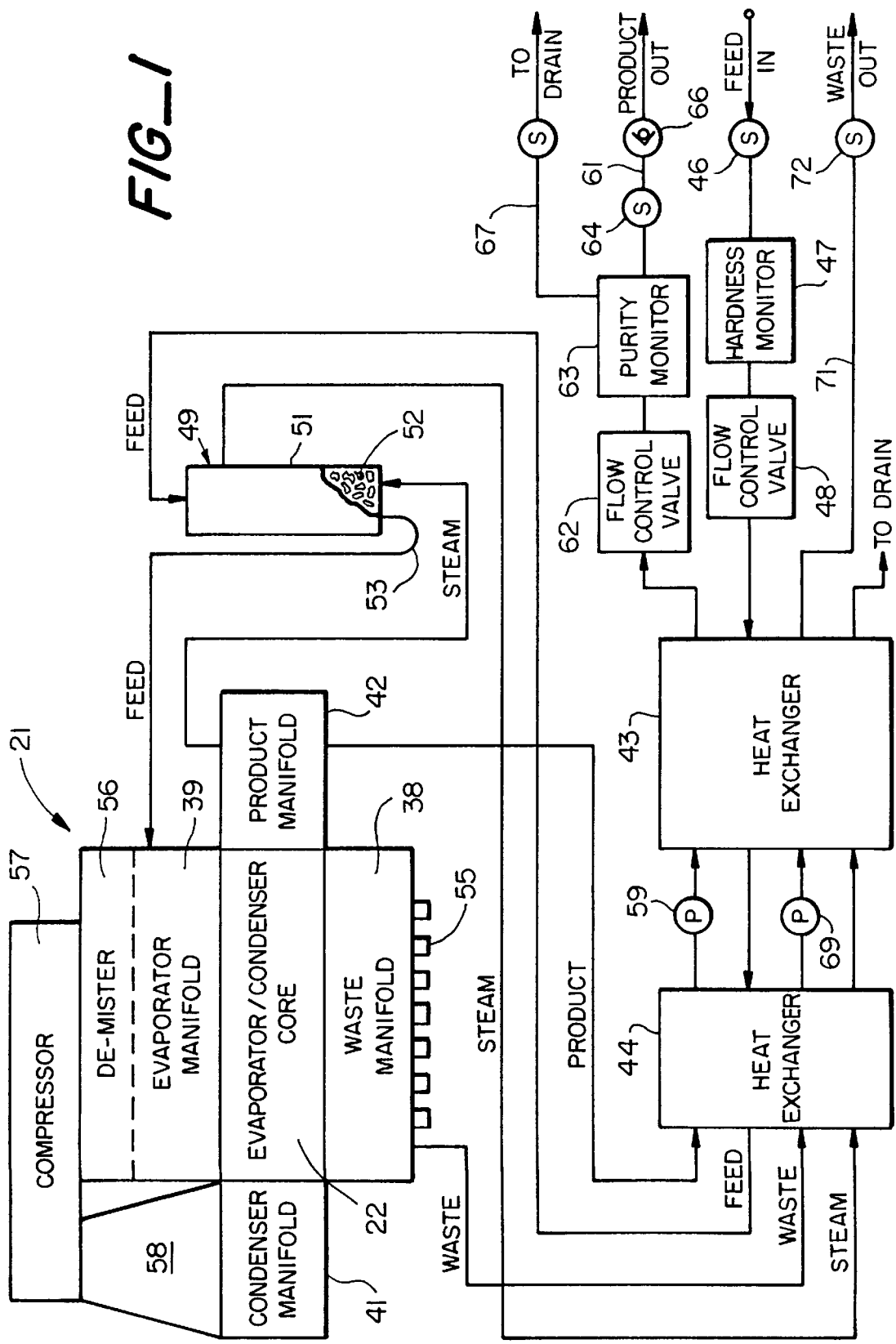
FIG_1

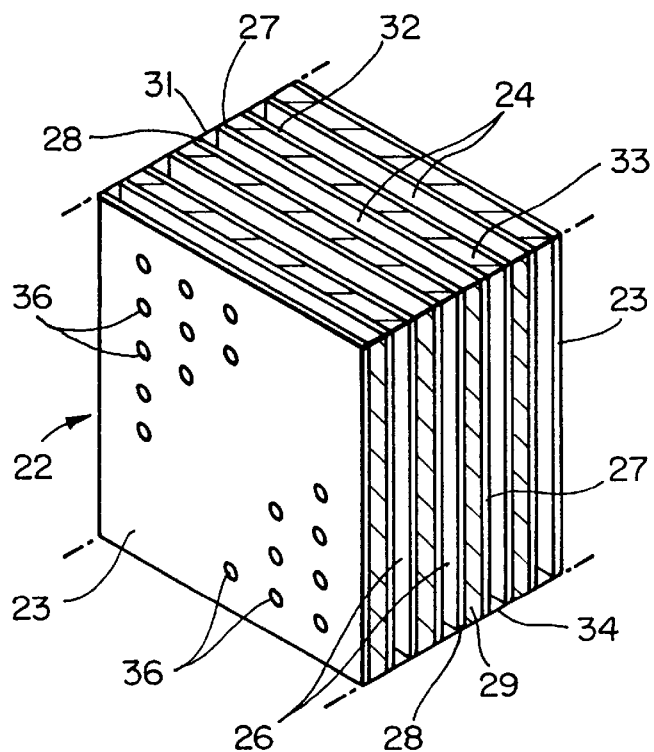
FIG_2
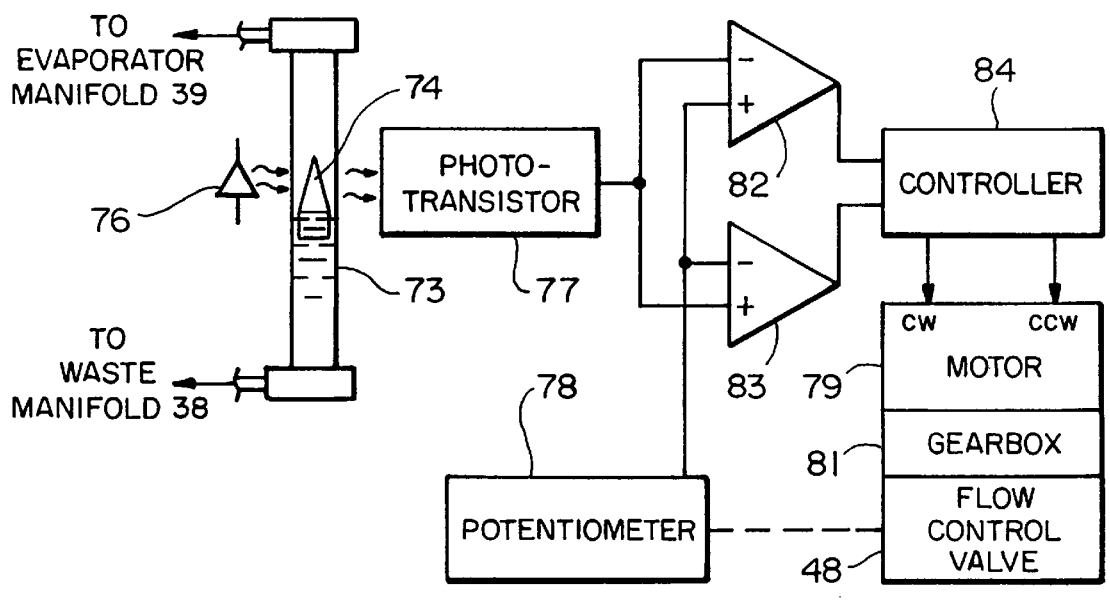
FIG_3

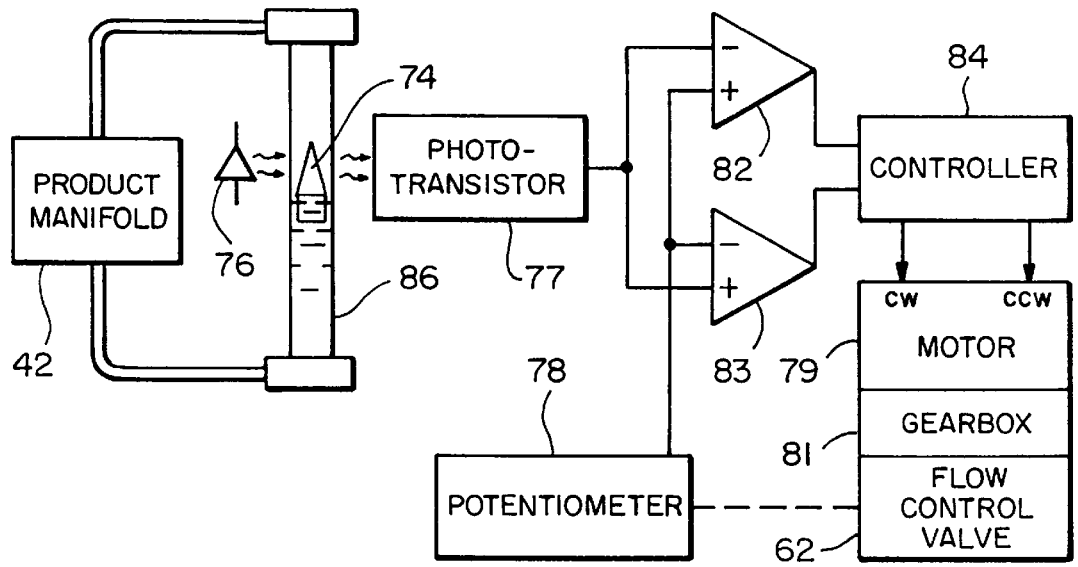
FIG_4
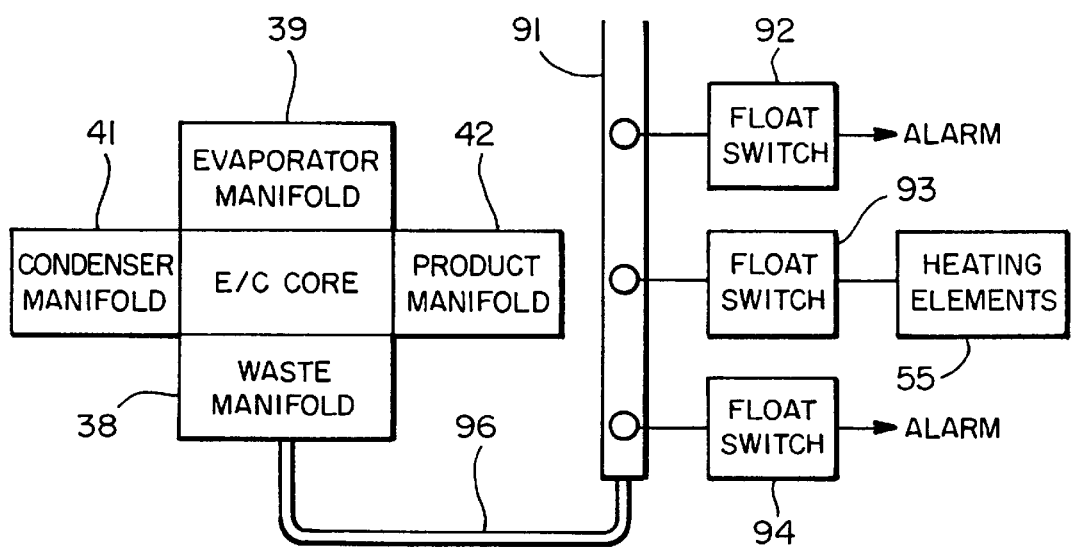
FIG_5

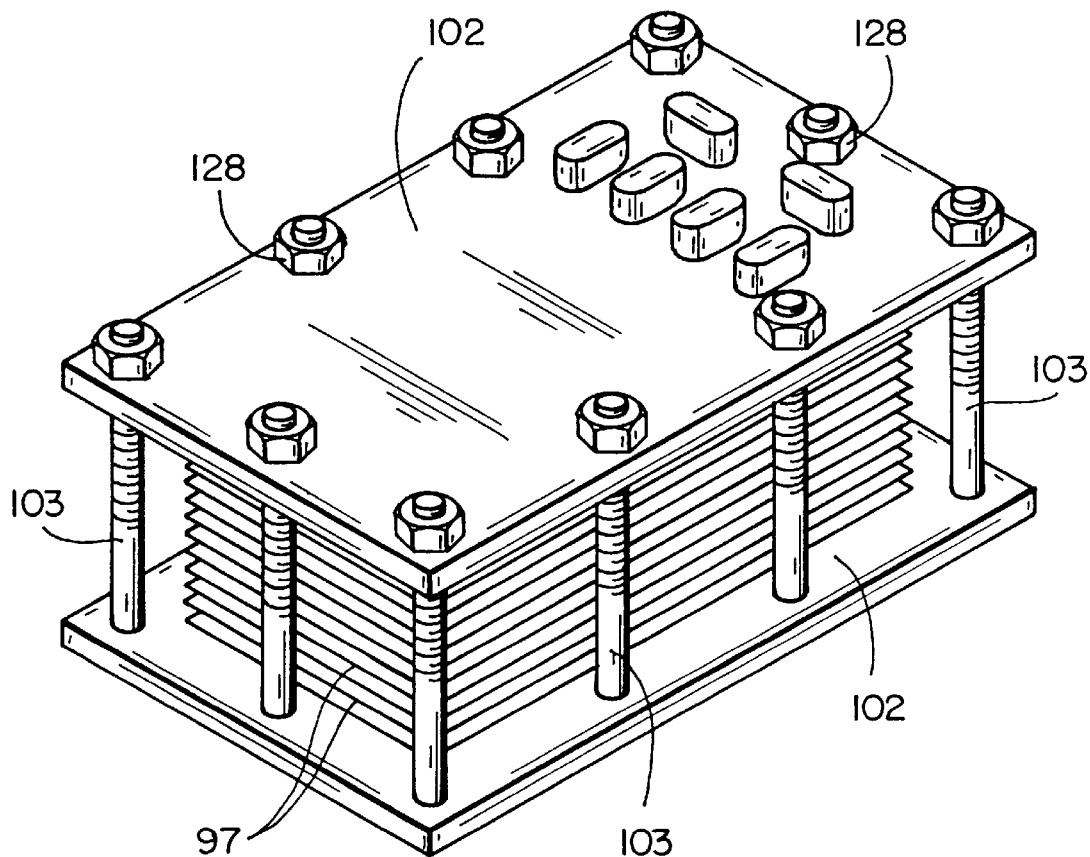
FIG_6
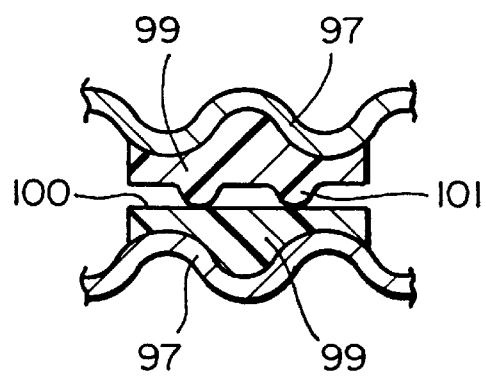
FIG_8

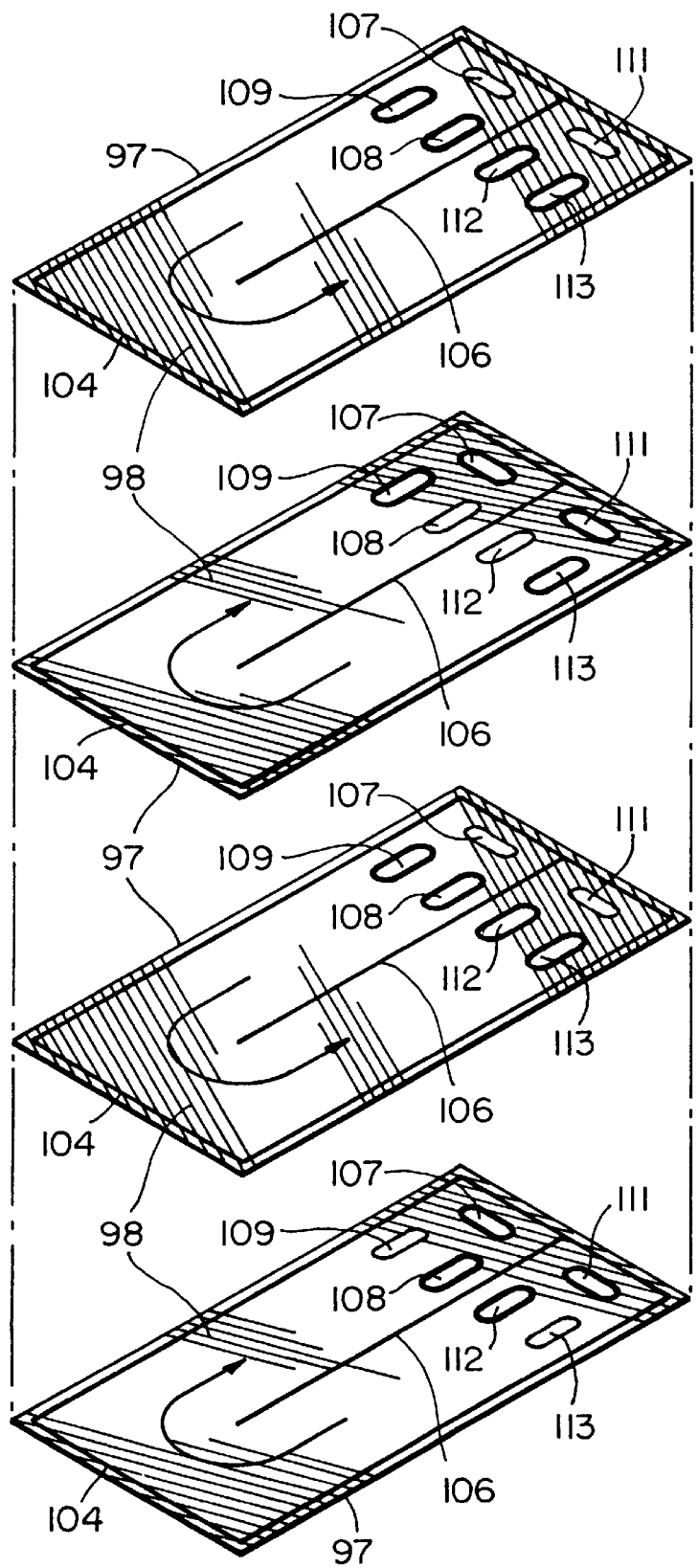
FIG_7

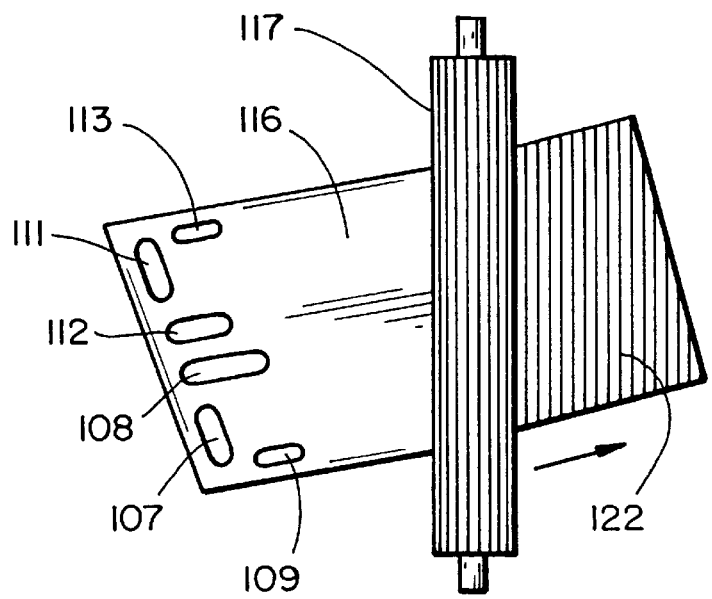
FIG_9
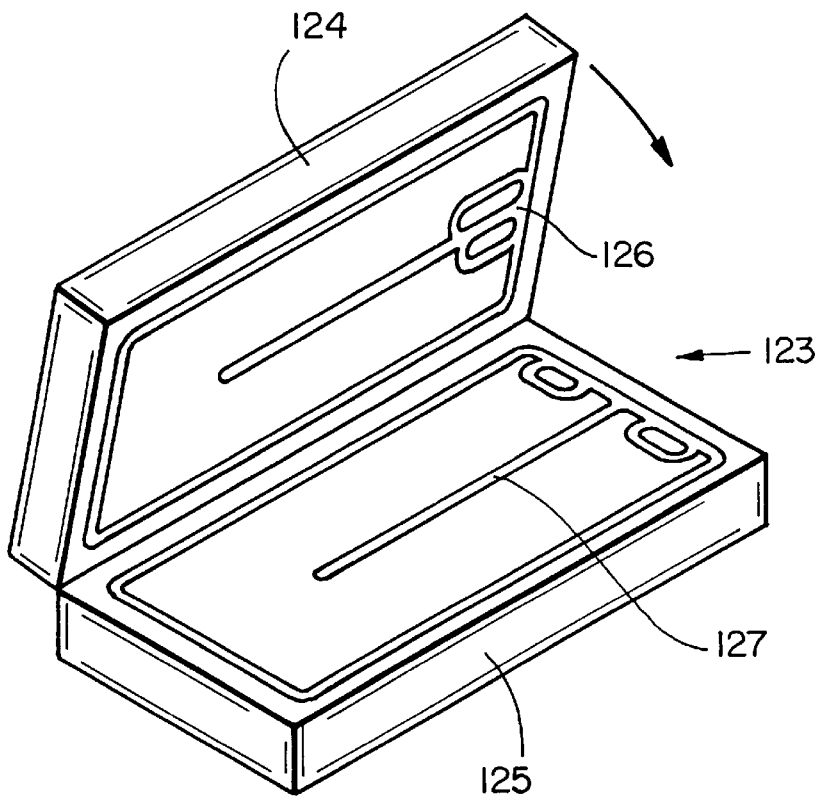
FIG_10

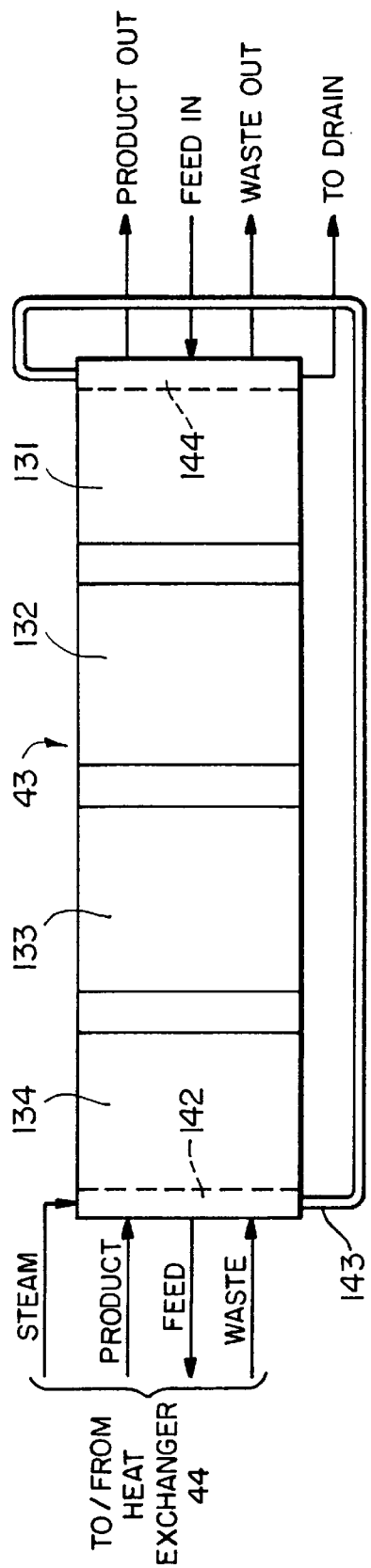
FIG_11
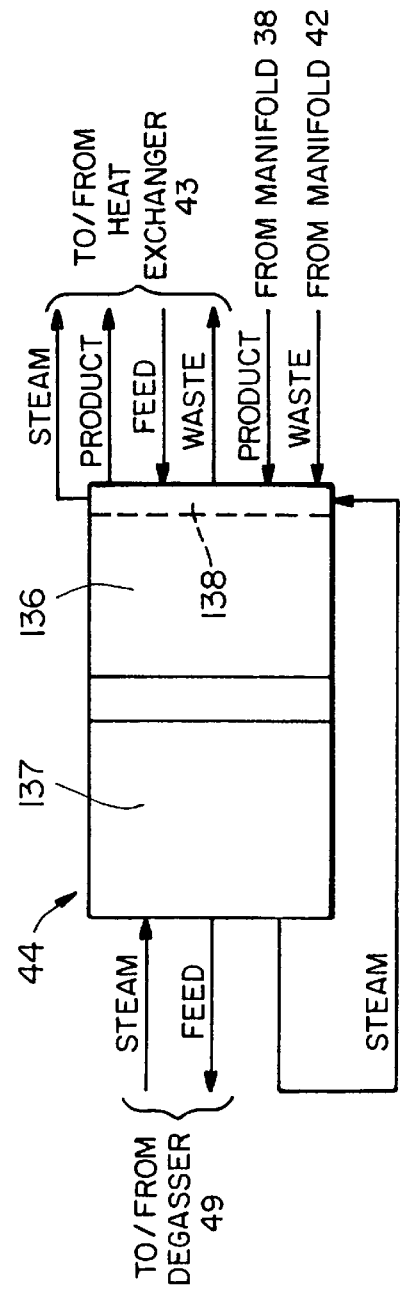
FIG_12

VAPOR COMPRESSION DISTILLATION SYSTEM AND METHOD

BACKGROUND OF THE INVENTION

1. Field of Invention

This invention pertains generally to the distillation of water and other liquids and, more particularly, to a distillation system and method utilizing vapor compression.

2. Related Art

U.S. Pat. Nos. 4,671,856, 4,769,113 and 4,869,067 describe a vapor compression distillation system and method in which a feed liquid enters a plate-type heat exchanger where it is preheated by heat transfer from an outgoing distilled product and waste in a three fluid, fluid-to-fluid heat transfer process. The preheated feed liquid is degassed and fed to a plate-type evaporator/condenser which has counter-flow evaporating and condensing chambers formed alternately between stacked metal plates which are separated by gaskets. Impure feed liquid enters the evaporating chambers where it boils. Heated vapor leaving the evaporating chambers passes through a mesh that removes mist, and is then pressurized by a low pressure compressor. The pressurized vapor is delivered to the condenser chambers, where it condenses as the distilled product, giving up heat to the feed liquid in the boiling chambers, and is then discharged from the system. Unvaporized feed liquid containing dissolved solids is likewise collected and discharged from the system. The liquids and vapors pass into and out of the evaporating and condensing chambers through internal manifolding consisting of openings in the plates and gaskets to provide communication between the proper manifolds and chambers.

A somewhat similar system is described in U.S. Pat. No. 5,597,453 the disclosure of which is incorporated herein by reference. That system, however, differs from the one shown in the earlier patents in that the internal manifolding has been replaced with external manifolds which are mounted adjacent to the edges of the evaporator/condenser plates and communicate with the chambers through gaps in the gaskets along the edges of the plates.

OBJECTS AND SUMMARY OF THE INVENTION

It is in general an object of the invention to provide a new and improved system and method for distilling water and other liquids.

Another object of the invention is to provide a distillation system and method of the above character which overcomes certain limitations and disadvantages of distillation systems of the prior art.

These and other objects are achieved in accordance with the invention by providing a distillation system having an evaporator/condenser core with heat transfer plates welded together along their edges to form alternate boiling and condensing chambers. Feed liquid is supplied to the boiling chambers through a pair of heat exchangers which preheat the liquid and a steam stripper utilizing ceramic pieces to remove gasses from the liquid. Vapor from the boiling chambers is compressed and delivered to the condensing chambers where it is condensed and gives up its heat to the liquid in the boiling chambers. Pumps positioned between the two heat exchangers draw the condensed product and unvaporized feed liquid containing dissolved solids from the evaporator/condenser and circulate them through the heat exchangers to transfer heat to the feed liquid.

The level of the liquid in the boiling chambers is maintained by means of a sight glass and a photosensor which monitors the level of liquid in the sight glass and controls the operation of a valve in the feed line to control the amount of feed liquid delivered to the boiling chambers.

The distilled product is collected in a manifold at the output side of the condensing chamber, and the level of the product in the manifold is maintained by means of another sight glass and sensor which controls the operation of a valve in the product line downstream of the two heat exchangers.

Pressure in the boiling chambers is monitored by means of a manometer tube with level switches which control the application of heat to the chambers and shut the system down in case the pressure gets too high or too low.

The heat exchanger has corrugated plates which are formed by a rolling process and clamped together, with seals bonded to the plates defining counter-flow chambers between them for the different liquids.

BRIEF DESCRIPTION OF THE DRAWINGS

FIG. 1 is schematic diagram of one embodiment of a vapor compression distillation system incorporating the invention, which is particularly suitable for use in purifying water.

FIG. 2 is an isometric view, somewhat schematic, of a portion of the evaporator/condenser core in the embodiment of FIG. 1.

FIG. 3 is a block diagram of a level control for maintaining the water in the boiling chambers of the evaporator/condenser at a predetermined level in the embodiment of FIG. 1.

FIG. 4 is a block diagram of a level control for maintaining the water in the product manifold of the evaporator/condenser at a predetermined level in the embodiment of FIG. 1.

FIG. 5 is a block diagram of a pressure sensor and control for the evaporator/condenser in the embodiment of FIG. 1.

FIG. 6 is an isometric view of one of the heat exchangers in the embodiment of FIG. 1.

FIG. 7 is an exploded isometric view of some of the heat transfer plates in the heat exchanger of FIG. 6.

FIG. 8 is an enlarged, fragmentary cross-sectional view of one of the seals in the heat exchanger of FIG. 6.

FIG. 9 illustrates the formation of a heat transfer plate for the heat exchanger of FIG. 6.

FIG. 10 is an isometric view of a mold for applying seals to a heat transfer plate for the heat exchanger of FIG. 6.

FIGS. 11 and 12 are schematic diagrams of the heat exchangers in the embodiment of FIG. 1.

DESCRIPTION OF THE PREFERRED EMBODIMENTS

As illustrated in the drawings, the distillation system includes an evaporator/condenser 21 which has a core 22 of closely spaced vertically extending plates 23 between which boiling chambers 24 and condensing chambers 26 are formed. The plates are fabricated of a metal such as titanium or stainless steel and are welded together along their edges to form the chambers.

The welding is done along alternate edges, with the boiling chambers being open at the top and bottom edges of the plates and the condensing chambers being open at the side edges. Each plate in the stack thus has a boiling chamber on one side of it and a condensing chamber on the other. In the example shown in FIG. 2, plates 27, 28 are welded together along their side edges 29, 31 to form a boiling chamber 24, and plates 27, 32 are welded together along their top edges 33 and their bottom edges 34 to form a condensing chamber 26. Spacing between adjacent plates in the stack is maintained by dimples 36 in the plates.

With the plates welded together, there is no need for any gaskets or seals in the core, which makes the core easier and more economic to manufacture. In addition, it eliminates the possibility of gasket or seal failure, and provides a more durable core which has a substantially longer expected lifetime.

The evaporator/condenser also has manifolds for delivering the liquid and vapors to and from the chambers in the core. These manifolds include a waste manifold 38 which is positioned below the core and communicates with the boiling chambers through the openings between the unwelded lower edges of the plates. An evaporator manifold 39 is positioned above the plates and communicates with the boiling chambers through the unwelded upper edges of the plates. A condenser manifold 41 is positioned to one side of the core and communicates with the condensing chambers through the unwelded edges on one side of the plates. A product manifold 42 is positioned on the other side of the core and communicates with the condensing chambers through the unwelded edges on that side of the plates.

A pair of heat exchangers 43, 44 preheat the feed water with heat from the distillate and the concentrate produced by the system and also from steam generated in the system. The heat exchangers are plate-type, counter-flow heat exchangers in which the fluids between which heat is transferred flow past each other in opposite directions on the two sides of the heat transfer plates. The structure of the heat exchangers and the manner in which the fluids are passed through them are discussed hereinafter in greater detail.

Feed water is supplied to the system under pressure through a feed water line 45 which includes a solenoid shut-off valve 46, a hardness monitor 47, and a flow control valve 48. As discussed more fully hereinafter, the flow control valve is utilized to control the level of the water in the boiling chamber.

Cold feed water from the inlet line passes through heat exchangers 43, 44 where it is preheated to steam temperature. It leaves the heat exchangers as bubbly water and is delivered to a steam stripper or degasser 49 which removes non-condensable gasses from it. The steam stripper has a cylindrical housing 51 which is packed with pieces 52 of ceramic material of irregular shape such that voids of substantial size are formed between the pieces. The feed water is introduced into the stripper though the top of the housing and removed through a P-trap fitting 53 toward the bottom. Steam is supplied to the lower portion of the stripper through a line 54 connected to the product manifold 42 of the evaporator/condenser. Excess steam is removed from the upper portion of the stripper and passed through heat exchangers 43, 44 to cool it down and to aid in preheating the feed water.

The degassed feed water from the steam stripper is introduced into the upper portions of the boiling chambers through evaporator manifold 39. Electrically energized strip heaters 55 are mounted on the under side of waste manifold 38 for heating the water in the boiling chambers. The feed water which enters the boiling chambers is already at steam temperature, and the system operates so efficiently that the heaters are normally not turned on. They are, however, available in the event that the need for "make-up" heat should arise.

A de-mister 56 is mounted in the evaporator manifold 39 for removing drops of water from the steam leaving the boiling chamber. The de-mister comprises a pad of fiber mesh which overlies the entire core and has a thickness on the order of 6 inches. Steam passes through the mesh relatively unobstructed, but water droplets tend to strike the mesh, collect there, and fall back into the boiling chambers.

A low pressure compressor 57 draws the steam from the evaporator manifold, compresses it and delivers the compressed steam through a tapered duct 58 to the condenser manifold 41. The condenser manifold is relatively large, and the duct increases in size as it approaches the manifold in order to reduce the velocity of the steam and thereby increase its pressure. The compressor can, for example, be of the type disclosed in U.S. Pat. No. 4,919,592, with a liquid seal of the type disclosed in U.S. Pat. No. 4,902,197, the disclosures of those two patents being incorporated herein by reference.

As the steam passes through the condensing chambers, it condenses on the plates which separate the chambers, giving up heat to the plates and to the water in the boiling chambers on the other sides of the plates. The purified water from the condensing chambers is collected in the product manifold 42 and delivered from that manifold to heat exchanger 44. A pump 59 is connected between the product water outlet of heat exchanger 44 and the product water inlet of heat exchanger 43 for passing the product water through the two heat exchangers. The fluid in the product manifold is about 99.5% pure water and about 0.5% steam. The steam is recycled to the degasser and used in removing gasses from the feed water.

The product water outlet of heat exchanger 43 is connected to an outlet line 61 which includes a flow control valve 62, a purity monitor 63, a solenoid shut-off valve 64, and a check valve 66. Any water which does not have the desired purity is diverted from the product outlet through a diverter line 67 to a drain.

Waste water is removed from waste manifold 38 and delivered to the waste water inlet of heat exchanger 44. A pump 69 is connected between the waste water outlet of heat exchanger 44 and the waste water inlet of heat exchanger 43, and the waste water outlet of heat exchanger 43 is connected to a waste line 71 which includes a solenoid shut-off valve 72. Pump 69 draws the water from the waste manifold through the first heat exchanger and pumps it through the second heat exchanger and the outlet line. This pump operates continuously at a rate suitable for removing unvaporized water and dissolved solids from the manifold beneath the boiling chambers.

The water from the product manifold and the water from the waste manifold are at steam temperature, and by passing them through one of the heat exchangers before they pass through the pumps, the water is cooled enough to ensure that the pumps will not cavitate notwithstanding the drop in pressure which occurs.

The water in the boiling chambers is maintained at a desired level by a level control which includes a transparent sight tube 73 connected to the evaporator manifold and to the waste manifold. With the tube connected to points above and below the water level in the boiling chambers, water enters the tube and rises to the level of the water in the chambers. If the water is boiling to the tops of the plates, the water level would be about midway up the plates if it were not boiling, and that is the level to which the water rises in the sight tube since it does not boil in the tube.

A conically tapered float 74 floats on the water in the sight tube, and its position is monitored by an photosensor consisting of a light emitting diode 76 and a phototransistor 77 which are mounted on opposite sides of the tube. The phototransistor produces a voltage which varies in magnitude with the level of the water in the sight tube. That voltage is used for controlling valve 48 which determines rate at which feed water is introduced into the chambers.

In one presently preferred embodiment, control valve 48 is a ball valve, and the position of the valve is monitored by means of a potentiometer 78 connected to the stem of the valve. The valve is operated by means of an electric motor 79 which is connected to the valve stem through speed reducing gears 81.

As illustrated in FIG. 3, the level sensor voltage and the valve position voltage are applied to the inputs of a pair of differential amplifiers 82, 83. Each of the two voltages is applied to the positive input of one amplifier and to the negative input of the other, and the two amplifiers produce output voltages corresponding to the difference between the voltages. The outputs of the two amplifiers are applied to a controller 84 which applies a voltage to the valve motor to turn the valve in one direction if the sensor voltage is greater than the valve position voltage and in the opposite direction if the valve position voltage is greater. The direction in which the valve is turned is the one which tends to make the two voltages equal.

A similar level control maintains the level of the water in product manifold 42 at a safe level. As illustrated in FIG. 4, that control is identical to the level control for the boiling chambers, except that it has a sight tube 86 which is connected to the top and bottom of the product manifold, and the valve which is controlled is the flow control valve 62 in the product output line. As in the case of the other level control, the sensor voltage is compared with a valve position voltage, and a voltage is applied to the drive motor to adjust the valve and thereby maintain the product water at the desired level, e.g. one inch above the bottom of the product manifold. Valve 62 serves as a restrictive orifice in the product line, and closing it increases the level of the water in the product manifold.

Pressure in the boiling chambers is controlled by a manometer tube 91 with float switches 92–94 disposed therein. The tube extends vertically, and the upper end of the tube is open to the atmosphere. The lower end of the tube is connected to the waste manifold by a hose 96. Water enters the tube from the manifold and rises to a level corresponding to the pressure in the boiling chambers. Those chambers normally operate at a pressure close to atmospheric pressure, and when they do, the water in the manometer tube is at the same level as the water in the chambers.

Float switches 92, 94 function as high and low pressure sensors, and switch 93 controls the operation of heating elements 55. When the water level is below switch 93, the heating elements are turned on to increase the pressure in the chambers, and when the water level is above the switch, the heating elements are turned off. If the water rises above the level of switch 92 or below the level of switch 94, those switches are actuated to deliver an alarm signal which causes the entire system to shut down. That prevents the pressure within the system from becoming either too high for safety or so low that air could be drawn into the boiling chambers through the manometer tube.

Heat exchangers 43, 44 are similar in construction, although one has a higher capacity (more plates) than the other, and the flows are directed through the two somewhat differently. As illustrated in FIGS. 6–8, each of the heat exchangers has a plurality of corrugated plates 97 stacked together to form a core. The plates are rectangular, and the corrugations 98 extend across the plates at an angle on the order of 30° to the ends of the plates. The plates are stacked alternately, with the corrugations in adjacent plates running in opposite directions so that the plates are held apart by the corrugations, rather than nesting together.

Separate chambers for the feed water, the product water and the waste water are formed between the plates and arranged in such manner that the feed water flows in an opposite direction to the product water and the waste water on the two sides of the plates. The chambers are defined by gaskets or seals between the plates. Each seal consists of two parts, one bonded to each of the two adjacent plates. The seal on one plate consists of a strip of sealing material 99, such as silicone or urethane, which has a planar surface 100 that is about ¼ to ⅜ inch in width. The mating seal on the other plate has a pair of beads 101 spaced about ⅛ inch apart. When the plates are positioned face-to-face, the beads on one plate seal tightly against the flat surface on the other.

The stack of plates is held tightly together by rigid pressure blocks 102 on the outer sides of the stack and drawbolts 103 which extend between the blocks. The blocks are of greater later extent than the plates, and the drawbolts pass by the edges of the plates outside the core. That makes the core easy to assemble, and the drawbolts are readily tightened to the degree necessary to assure good seals between the plates.

The arrangement of the chambers is such that every other chamber in the stack is a feed water chamber, with a product water chamber or a waste water chamber between the feed water chambers. As discussed more fully hereinafter, the relative numbers of product chambers and waste water chambers depend upon the relative amounts of product water and waste water being discharged from the system.

The seals which define each of the chambers include a perimetric seal 104 and a longitudinally extending seal 106 which divides the chamber into a U-shaped flow channel. Openings for the three liquids are formed in the plates toward one end thereof within the area bounded by the perimetric seal. The inlet opening for the feed water 107 and the outlet openings for the product water 108 and the waste water 109 are located toward one end of the U-shaped channels, and the outlet opening for the feed water 111, the inlet opening 112 for the product water, and the inlet opening 113 for the waste water are located toward the other end.

For a given chamber, only one pair of openings is open to the chamber, and the other two pairs have seals around them. Thus, for example, for a feed water chamber, product and waste water openings 108, 109 and 112, 113 have seals around them, but feed water openings 107, 111 do not. Similarly, for a product water chamber, openings 107, 109 and 111, 113 have seals around them, and for a waste water chamber, openings 107, 108 and 111, 112 have seals around them.

The heat exchanger is manufactured by cutting sheets 116 of metal to the shape of a parallelogram, punching the manifold openings 107–109, 111–113 in the sheets, and feeding the sheets between a pair of corrugating rollers 117, as illustrated in FIG. 9. As the plates are corrugated, they change from a parallelogram shape to a rectangular shape, with the corrugations 122 extending across the plates at the 30° angle relative to the ends of the rectangle.

The corrugated plates are then placed in a mold 123 where the seals are formed. The mold has dies 124, 125 with cavities 126, 127 corresponding to the desired shapes of the seals. The sealing material is placed in the cavities in liquid form, the plates are placed between the dies, and heat and pressure are applied to bond the seals to the plates and cure them. The seals are formed simultaneously on both sides of a plate, and the same type of seal (flat or beaded) is formed on both sides of a given plate.

After the seals are formed, the plates are removed from the mold and stacked together in the proper order on top of one of the pressure blocks 102. The other block is placed on top of the stack, and drawbolts 103 are inserted through holes in the blocks. Nuts 128 are then tightened on the drawbolts draw the plates together and compress the seals.

As illustrated in FIG. 11, heat exchanger 43 has four separate heat exchange sections 131–134. Each section has eighty plates, which provide eighty flow channels or chambers, forty for feed water and forty for the product water and waste water. The particular heat exchanger is designed for use in a system which produces 1,000 gallons of purified water and discharges 250 gallons of waste water per hour. The feed water is input to the system at a rate of 1,250 gallons per hour. Since the amount of product water is four times the amount of waste water, thirty-two flow channels in each section carry product water, and eight carry waste water.

In each section, the chambers are connected in parallel, and the four sections are connected in series. Thus, the water passes through all of the chambers in one section simultaneously, the passes through the chambers in the next section. The four sections are thermally isolated from each other by one or more empty chambers between them.

The feed water from the feed water line passes first through section 131, then through section 132, then section 133 and finally section 134. The product water and waste water from heat exchanger 44 go in the opposite direction, passing first through section 134, then section 133, then section 132 and finally section 131. With each pass, the feed water gets hotter, and the product water and the waste water get cooler. By the time the product water and the waste water exit section 131, they have given up substantially all of their heat and are just a few degrees warmer than the incoming feed water.

As illustrated in FIG. 12, heat exchanger 44 has two sections 136, 137. Section 136 has eighty plates which form eighty flow channels or chambers, forty for the feed water, thirty-two for the product water and eight for the waste water. Section 137 has forty plates which form forty flow channels or chambers, twenty for the feed water and twenty for steam. The two sections are thermally isolated from each other by one or more empty chambers between them. The feed water from section 134 of the first heat exchanger is passed first through section 136, then through section 137. In section 136, the feed water is heated almost to steam temperature by the product water from product manifold 42 and by the waste water from waste manifold 38.

The steam from degasser 49 passes through section 137 of heat exchanger 44, bringing the feed water up to steam temperature. The steam then passes through to the other side of the exchanger and through the end chamber 138 in section 136. From there, the steam passes through the outermost chamber 142 in the hottest section 134 of heat exchanger 43, through a pipe 143 to the coldest section 131, and through the outermost chamber 144 in that section. By the time the steam leaves that chamber, it has been converted to cold water with bubbles in it, and it is discharged to a drain.

Although the invention has been disclosed with specific reference to a system for purifying water, which is a presently preferred use for it, it can also be utilized in a number of other applications. It can, for example, be used for distilling other liquids, such as alcohol, and it can also be used for concentrating products such as juices and brines. When used as a concentrator, the condensate is the desired product instead of being the waste as it is in water purification. Other uses for the system include fractionation, recovery of chemicals from waste water, and heat exchange between liquids.

The system can be constructed in modular form, and a plurality of modules can be connected together in parallel to provide any desired capacity. When the modules are connected together in that manner, it is not necessary to have a separate compressor for each unit, and all of the steam can be run through a single compressor.

The invention has a number of important features and advantages. It provides a highly efficient distillation system which requires little or no maintenance and is economical to manufacture as well as to use.

It is apparent from the foregoing that a new and improved distillation system and method have been provided. While only certain presently preferred embodiments have been described in detail, as will be apparent to those familiar with the art, certain changes and modifications can be made without departing from the scope of the invention as defined by the following claims.

I claim:

1. A distillation system comprising: a plurality of closely spaced vertically extending heat transfer plates disposed face-to-face and welded together along edge portions thereof to alternately form boiling chambers and condensing chambers between the plates, the boiling chambers being open alone upper and lower edges thereof and the condensing chambers being open along side edges thereof, means for introducing a feed liquid into the boiling chambers for conversion to a vapor, a lower manifold beneath the plates and in fluid communication with the boiling chambers for collecting unvaporized liquid, an evaporator manifold above the plates for collecting vapor from the boiling chambers, a condenser manifold communicating with the condensing chambers at a first side edge of the plates, means connected between the evaporator manifold and the condenser manifold for compressing the vapor and delivering the compressed vapor to the condensing chambers, a product manifold communicating with the condensing chambers at a second side edge of the plates for collecting condensate from the condensing chambers, a vertically extending sight tube connected to the evaporator manifold and to the lower manifold with liquid in the sight tube at a level corresponding to the level of the liquid in the boiling chambers, means for monitoring the level of the liquid in the sight tube, and means responsive to the level of the liquid in the sight tube for controlling the rate at which the feed liquid is introduced into the boiling chambers.

2. A distillation system comprising: a plurality of closely spaced vertically extending heat transfer plates disposed face-to-face and welded together along edge portions thereof to alternately form boiling chambers and condensing chambers between the plates, the boiling chambers being open along upper and lower edges thereof and the condensing chambers being open along side edges thereof, means for introducing a feed liquid into the boiling chambers for conversion to a vapor, a lower manifold beneath the plates and in fluid communication with the boiling chambers for collecting unvaporized liquid, an evaporator manifold above the plates for collecting vapor from the boiling chambers, a condenser manifold communicating with the condensing chambers at a first side edge of the plates, means connected between the evaporator manifold and the condenser manifold for compressing the vapor and delivering the compressed vapor to the condensing chambers, a product manifold communicating with the condensing chambers at a second side edge of the plates for collecting condensate from the condensing chambers, a manometer tube having an upper end which is open to atmosphere and a lower end which communicates with the lower manifold so that liquid from the boiling chambers enters the manometer tube and rises to a level corresponding to pressure within the boiling chambers, and means for monitoring the level of the liquid in the manometer tube and delivering a signal when the liquid reaches a predetermined level.

3. A distillation system comprising: an evaporator/condenser having boiling and condensing chambers, means including a control valve for introducing a feed liquid into the boiling chambers for conversion to a vapor, means for compressing the vapor, means for passing the compressed vapor through the condensing chambers to condense the vapor and transfer heat from the vapor to the liquid in the boiling chambers, a vertically extending sight tube in fluid communication with the boiling chambers and having liquid therein at a level corresponding to the level of the liquid in the boiling chambers, a conically tapered float which moves in accordance with the level of the liquid in the sight tube, a photosensor for monitoring the level of the float and providing a voltage having a level which corresponds to the level of the liquid in the sight tube, and means responsive to the voltage level for controlling the valve and thereby the amount of liquid introduced into the boiling chambers.

4. A distillation system comprising: an evaporator/condenser having boiling and condensing chambers, means including a control valve for introducing a feed liquld into the boiling chambers for conversion to vapor, means for compressing the vapor, means for passing the compressed vapor through the condensing chambers to condense the vapor and transfer heat from the vapor to the liquid in the boiling chambers, a vertically extending sight tube in fluid communication with the boiling chambers and having liquid therein at a level corresponding to the level of the liquid in the boiling chambers, a float which moves in accordance with the level of the liquid in the sight tube, a photosensor for monitoring the level of the float and providing a voltage corresponding to the level of the liquid in the sight tube, an electrically actuated motor operatively connected to the valve, means for providing a voltage corresponding to the operative position of the valve, means for comparing the sensor voltage with the valve position voltage and applying a drive voltage to the motor to adjust the valve so as to make the motor position voltage and the sensor voltage equal to each other.

5. A distillation system comprising: an evaporator/condenser having boiling and condensing chambers, means for introducing a feed liquid into the boiling chambers for conversion to a vapor, means for compressing the vapor, means for passing the compressed vapor through the condensing chambers to condense the vapor and transfer heat from the vapor to the liquid in the boiling chambers, a manometer tube having an upper end which is open to atmosphere and a lower end which is connected in communication with the boiling chambers so that liquid from the boiling chambers enters the manometer tube and rises to a level corresponding to pressure within the boiling chambers, means including upper and lower float switches for monitoring the level of the liquid in the manometer tube and delivering an alarm signal when the liquid in the tube rises above a predetermined upper limit or drops below a predetermined lower limit, a heater for applying heat to the liquid in the boiling chamber, and a third float switch positioned between the upper and lower switches for turning the heater on when the liquid in the tube is below a predetermined level and off when the liquid is above the predetermined level.

6. A distillation system comprising: an evaporator/condenser having boiling and condensing chambers, means for introducing a feed liquid into the boiling chambers for conversion to a vapor, means for compressing the vapor, means for passing the compressed vapor through the condensing chambers to condense the vapor and transfer heat from the vapor to the liquid in the boiling chambers, a product manifold in communication with the condensing chambers for collecting condensate from the condensing chambers, first and second heat exchangers through which the feed liquid passes before being introduced into the boiling chambers, a pump connected between the heat exchangers for pumping the condensate through the heat exchangers to transfer heat from the condensate to the feed liquid, a valve connected downstream of the pump for controlling flow through the pump, a vertically extending sight tube in fluid communication with the product manifold and having liquid therein at a level corresponding to the level of the liquid in the condensing chambers, a float which moves in accordance with the level of the liquid in the sight tube, a photosensor for monitoring the level of the float and providing voltage corresponding to the level of the liquid in the sight tube, an electrically actuated motor operatively connected to the valve, means for providing a voltage corresponding to the operative position of the valve, means for comparing the sensor voltage with the valve position voltage and applying a drive voltage to the motor to adjust the valve so as to make the motor position voltage and the sensor voltage equal to each other.

7. A distillation system comprising: an evaporator/condenser having boiling and condensing chambers, a steam stripper comprising a tank having pieces of ceramic material packed therein with void spaces between the pieces, means for introducing a feed liquid into the upper portion of the stripper tank, a steam inlet in the lower portion of the stripper tank connected to receive vapor from the boiling chambers, means for delivering feed liquid which has been stripped of gasses by the steam from the lower portion of the stripper tank to the boiling chambers for conversion to a vapor, means for compressing the vapor, means for passing the compressed vapor through the condensing chambers to condense the vapor and transfer heat from the vapor to the liquid in the boiling chambers, means for collecting condensate from the condensing chambers and unvaporized liquid from the boiling chambers, first and second heat exchangers through which the feed liquid passes before being introduced into the stripper tank, pumps connected between the heat exchangers for pumping the condensate and the unvaporized liquid through the heat exchangers to transfer heat from the condensate and from the unvaporized liquid to the feed liquid, a third heat exchanger, means for passing the feed liquid from the first and second heat exchangers through the third heat exchanger, and means for delivering steam from the steam stripper to the third heat exchanger to further heat the feed liquid.

8. A distillation system comprising: an evaporator/condenser having a plurality of closely spaced vertically extending heat transfer plates disposed face-to-face and welded together along edge portions thereof to alternately form boiling chambers and condensing chambers between the plates, the boiling chambers being open along upper and lower edges thereof and the condensing chambers being open along side edges thereof, means for introducing a feed liquid into the boiling chambers for conversion to a vapor, means for compressing the vapor, means for passing the compressed vapor through the condensing chambers to condense the vapor and transfer heat from the vapor to the liquid in the boiling chambers, means for collecting condensate from the condensing chambers and unvaporized liquid from the boiling chambers, first and second heat exchangers through which the feed liquid passes before being introduced into the boiling chambers, and pumps connected between the heat exchangers for pumping the condensate and the unvaporized liquid through the heat exchangers to transfer heat from the condensate and from the unvaporized liquid to the feed liquid.

9. A distillation system comprising: an evaporator/condenser having a plurality of closely spaced vertically extending heat transfer plates disposed face-to-face and welded together along edge portions thereof to alternately form boiling chambers and condensing chambers between the plates, the boiling chambers being open along upper and lower edges thereof and the condensing chambers being open along side edges thereof, means including a control valve for introducing a feed liquid into the boiling chambers for conversion to a vapor, means for compressing the vapor, means for passing the compressed vapor through the condensing chambers to condense the vapor and transfer heat from the vapor to the liquid in the boiling chambers, a vertically extending sight tube in fluid communication with the boiling chambers and having liquid therein at a level corresponding to the level of the liquid in the boiling chambers, a float which moves in accordance with the level of the liquid in the sight tube, a photosensor for monitoring the level of the float and providing a signal corresponding to the level of the liquid in the sight tube, and means responsive to the signal for controlling the valve and thereby the amount of liquid introduced into the boiling chambers.

10. A distillation system comprising, an evaporator/condenser having a plurality of closely spaced vertically extending heat transfer plates disposed face-to-face and welded together along edge portions thereof to alternately form boiling chambers and condensing chambers between the plates, the boiling chambers being open along upper and lower edges thereof and the condensing chambers being open along side edges thereof, means for introducing a feed liquid into the boiling chambers for conversion to a vapor, means for compressing the vapor, means for passing the compressed vapor through the condensing chambers to condense the vapor and transfer heat from the vapor to the liquid in the boiling chambers, a manometer tube having an upper end which is open to atmosphere and a lower end which is connected in communication with the boiling chambers so that liquid from the boiling chambers enters the manometer tube and rises to a level corresponding to pressure within the boiling chambers, and means for monitoring the level of the liquid in the manometer tube and delivering a signal when the liquid reaches a predetermined level.

11. A distillation system comprising: an evaporator/condenser having a plurality of closely spaced vertically extending heat transfer plates disposed face-to-face and welded together along edge portions thereof to alternately form boiling chambers and condensing chambers between the plates, the boiling chambers being open along upper and lower edges thereof and the condensing chambers being open along side edges thereof, means for introducing a feed liquid into the boiling chambers for conversion to a vapor, means for compressing the vapor, means for passing the compressed vapor through the condensing chambers to condense the vapor and transfer heat from the vapor to the liquid in the boiling chambers, a product manifold in communication with the condensing chambers for collecting condensate from the condensing chambers, first and second heat exchangers through which the feed liquid passes before being introduced into the boiling chambers, a pump connected between the heat exchangers for pumping the condensate through the heat exchangers to transfer heat from the condensate to the feed liquid, a valve connected downstream of the pump far controlling flow through the pump, a vertically extending sight tube in fluid communication with the product manifold and having liquid therein at a level corresponding to the level of the liquid in the condensing chambers, a float which moves in accrdance with the level of the liquid in the sight tube, a photosensor for monitoring the level of the float and providing a signal corresponding to the level of the liquid in the sight tube, and means responsive to the signal for controlling the valve and thereby the amount of liquid pumped out of the product manifold.

12. A distillation system comprising: an evaporator/condenser having a plurality of closely spaced vertically extending heat transfer plates disposed face-to-face and welded together along edge portions thereof to alternately form boiling chambers and condensing chambers between the plates, the boiling chambers being open along upper and lower edges thereof and the condensing chambers being open along side edges thereof, a steam stripper comprising a tank having pieces of ceramic material packed therein with void spaces between the pieces, means for introducing a feed liquid into the upper portion of the stripper tank, a stream inlet in the lower portion of the stripper tank connected to receive vapor from the boiling chambers, means for delivering feed liquid which has been stripped of gasses by the steam from the lower portion of the stripper tank to the boiling chambers for conversion to a vapor, means for compressing the vapor, means for passing the compressed vapor through the condensing chambers to condense the vapor and transfer heat from the vapor to the liquid in the boiling chambers.

* * * * *